(12) United States Patent
Mariappan

(10) Patent No.: US 11,274,408 B2
(45) Date of Patent: Mar. 15, 2022

(54) FLOOD MITIGATION SYSTEM

(71) Applicant: IR. DR. Saravanan Mariappan, Selangor (MY)

(72) Inventor: IR. DR. Saravanan Mariappan, Selangor (MY)

(*) Notice: Subject to any disclaimer, the term of this patent is extended or adjusted under 35 U.S.C. 154(b) by 0 days.

(21) Appl. No.: 16/649,931

(22) PCT Filed: Nov. 27, 2018

(86) PCT No.: PCT/MY2018/050082
§ 371 (c)(1),
(2) Date: Mar. 23, 2020

(87) PCT Pub. No.: WO2019/108054
PCT Pub. Date: Jun. 6, 2019

(65) Prior Publication Data
US 2020/0277747 A1    Sep. 3, 2020

(30) Foreign Application Priority Data
Nov. 28, 2017  (MY) .......................... PI 2017704570

(51) Int. Cl.
*E02B 5/00* (2006.01)
*E02B 3/04* (2006.01)
*E02B 3/02* (2006.01)
*E01D 18/00* (2006.01)
*E02B 3/10* (2006.01)
*E02B 5/04* (2006.01)
*E02B 13/00* (2006.01)
*E03F 1/00* (2006.01)

(52) U.S. Cl.
CPC ................ *E02B 3/02* (2013.01); *E01D 18/00* (2013.01); *E02B 3/10* (2013.01); *E02B 5/005* (2013.01); *E02B 5/04* (2013.01); *E02B 13/00* (2013.01); *E03F 1/001* (2013.01)

(58) Field of Classification Search
CPC ... E02B 3/02; E02B 3/10; E02B 5/005; E02B 5/04; E02B 13/00; E01D 18/00; E03F 1/001
See application file for complete search history.

(56) References Cited

U.S. PATENT DOCUMENTS

| 107,611 A | 9/1870 | Haines | |
|---|---|---|---|
| 1,878,383 A * | 9/1932 | Crouse | E02B 13/00 405/127 |

(Continued)

FOREIGN PATENT DOCUMENTS

| GB | 2379236 A | 3/2003 |
|---|---|---|
| JP | 2015007320 A | 1/2015 |

*Primary Examiner* — Tara Mayo-Pinnock
(74) *Attorney, Agent, or Firm* — Muncy, Geissler, Olds & Lowe, P.C.

(57) ABSTRACT

A system for flood water or water flow mitigation includes at least one aqueduct or drain having a first section linking a river, lake, reservoir, water retention pond or dam to another section linked to another lake, reservoir, storage tank or sea, characterized in that the first section are positioned at higher than the other section, and the aqueducts or drains are configured to be placed above ground level or extend upward from sides of river or existing drain, such that invert levels of the aqueducts or drains are higher than sea levels during high tide flooding or sea level increases.

11 Claims, 7 Drawing Sheets

(56) References Cited

U.S. PATENT DOCUMENTS 3,024,614 A * 3/1962 La Rue .................. E02B 13/02
                                                                      405/119
3,446,025 A    5/1969 Koch \* cited by examiner

FLOOD MITIGATION SYSTEM

FIELD OF INVENTION

The present invention generally relates to water, flood and drainage system to mitigate excess water, storm water or flood water from causing flood during wet seasons or stormy days.

BACKGROUND OF THE INVENTION

In recent decades, flooding of cities has become more apparent due to extreme weather conditions and ongoing city developments. For example, irregular patterns of the El Niño and La Niña phenomena (deviations from normal surface temperatures—El Niño is the warm phase, whereas La Niña is the cold phase—having large-scale impacts on ocean processes and global climate) have brought about droughts in certain regions and storms in other regions of the world. Under circumstances when storm events occur and the tides are high, excess water cannot be discharged into the sea by the river and existing types of drainage culverts as the backflow caused by the sea current is strong. Areas of extended river mouth due to land reclamation are especially susceptible to flood. This is due to the flow rate reduction of river caused by extending length of river with gentle gradient to the sea due to land reclamation activities near river mouth or formation of narrow and shallow straits between land and reclaimed land causing reduction in discharge rate of river and reduction of sea bed depth. Such situation worsens when the wind are strong, especially in the evening, due to the direction of land breeze that is blowing from the sea towards inland, creating high waves, forcing sea water to inland and drastic reduction in river discharge capacity into the sea.

Current flood mitigation measures generally involve the construction of monsoon drain, floodwall, floodgate, weir or dam based on ecological suitability and the characteristics of, for example, river, where overflows are prone to cause floods.

Monsoon drains are enlarged drains with high water holding capacity to divert water from flood-prone lands to flood free areas. Floodwall and floodgate are defense structures to prevent large volumes of rainwater or water from overflowing dam, river or lake from flooding the city. Weirs are constructed to alter the flow path of a river or channel. It causes an increase in the water depth as the water flows over the weir with greater or reduced flow rate. Dam serves as a barrier to stop or restrict the flow of water. As a result, it creates reservoirs that suppress floods and provide water for human activities. Sometimes, rivers are dug deeper to increase their water holding capacity.

Despite having the structures discussed above, certain inland areas are still prone to flooding during wet seasons, especially when the downpours are heavy. This is because the structures do not directly mitigate excess rainwater or overflows along existing river or drain paths. As such, additional water management structures that can hold water and divert large volumes of excess water are needed to directly address the flood issues in highly susceptible areas.

SUMMARY OF THE PRESENT INVENTION

The present invention features system for flood water or water flow mitigation, comprising: at least one aqueduct or channel having a first section linking a river, lake, reservoir, water retention pond or dam to another section linked to another lake, reservoir, storage tank or sea, characterized in that the first section are positioned at higher than the other section, and the aqueducts or channel are configured to be placed above ground level or extend upward from sides of river or existing drain, such that invert levels of the aqueducts or drains are higher than sea levels during high tide flooding or sea level increases.

Preferably, the aqueducts or drains are elevated above ground level using bridge-like structures.

Preferably, the bridge-like structure is supported by pillars, single piers or double piers.

Preferably, the aqueducts or drains are constructed along or across the path of river, drain or lake, or along road, highways and developed areas, or across mountain/hill using bypass tunnel integration.

Preferably, the aqueducts or drains extend upward from sides of river or existing drain as a free standing wall, dyke or bund to increase the water holding capacity of the river or drain.

Preferably, the upward extension includes additional channel to divert away overflowing water or storing the water, where the water can be used for irrigating, ground water recharging or water supply.

Preferably, the water is pumped from lake, river, retention pond, flood areas or storage tank into the aqueduct system using a plurality of pumps.

Preferably aqueducts are used in combination of flood diversion tunnels Preferably, the aqueducts or drains have multiple decks.

Preferably, multiple decks are used for water flow and as motorway, boating and recreational activities.

Further, a floodgate, dam or weirs are constructed at river mouth to channel water to aqueduct with increase invert levels to discharge water flow directly into the sea, at a higher level than high tide level.

Another embodiment of the invention is a method for mitigation flood water or water flow, comprising steps of: linking a first section of at least one aqueduct or channel to a river, lake, reservoir, water retention pond or dam and another section linked to another lake, reservoir, storage tank or sea, characterized in that, positioning the first section higher than the other section, and placing the aqueducts or channel to be above ground level or extend upward from sides of river or existing drain, such that invert levels of the aqueducts or drains are higher than sea levels during high tide flooding or sea level increases.

The present invention consists of features and a combination of parts hereinafter fully described and illustrated in the accompanying drawings, it being understood that various changes in the details may be made without departing from the scope of the invention or sacrificing any of the advantages of the present invention.

BRIEF DESCRIPTION OF THE DRAWINGS

To further clarify various aspects of some embodiments of the present invention, more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the accompanying drawings in which:

FIG. 9 is an illustration of the aqueduct system used as transport facility when the water is deep enough for vessels or boats to pass through.

Figure 11:
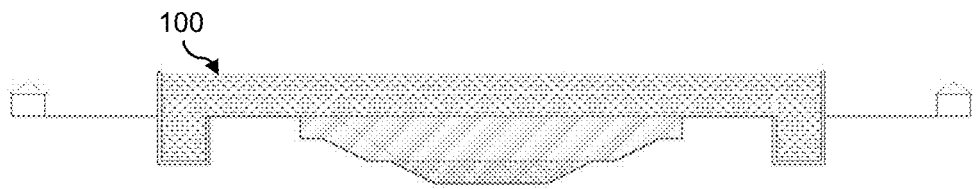

The FIG. 11, illustrates the installation of aqueducts with the increase of the river level.

Figure 12:
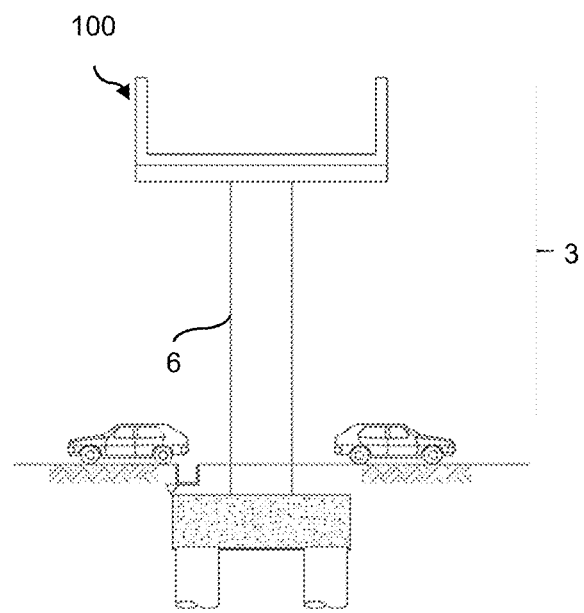

FIG. 12 is an illustration of the aqueduct at mid of road/or side of road/highway, in urban or rural site.

Figure 13:
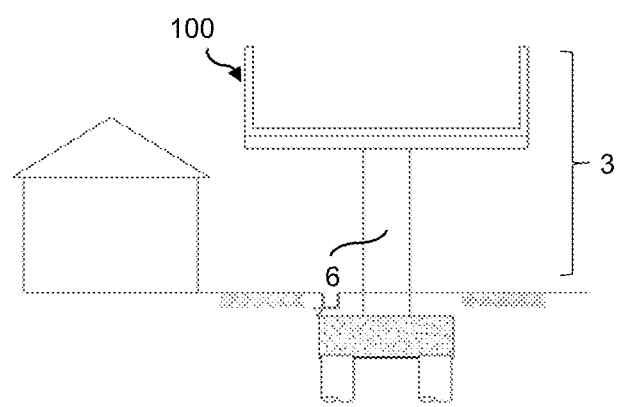

FIG. 13 is an illustration of aqueduct going across or along develop site as residential or city.

DETAILED DESCRIPTION OF THE INVENTION

The present invention introduces a flood mitigation system based on integrated, multifunctional aqueduct structures. An elevated aqueduct system captures water higher grounds so that the water are directed and discharged into the sea or other water retention areas. As a whole, the elevation of the aqueduct must be above high tide levels to allow unidirectional flow of water from land to sea in order to avoid floods or back flow of water.

Figure 1A:
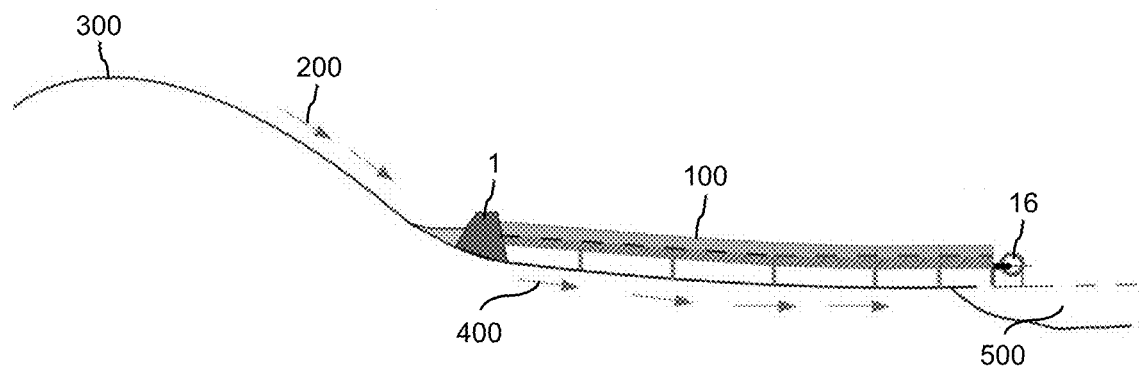
FIGS. 1A and 1B are illustration showing the aqueduct system connecting upstream river or dam to the sea, or a lake, retention pond or storage tank where the sea is far from inland.
Figure 1B:
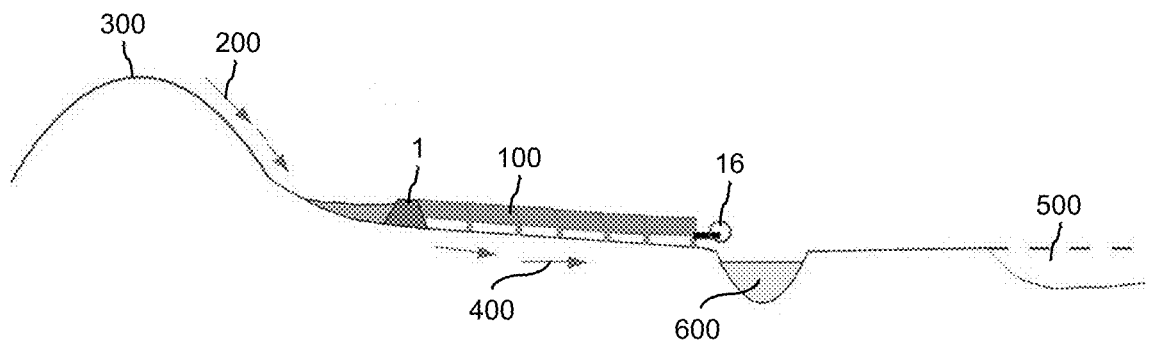

As shown in FIG. 1A, the intake of water into the aqueduct system (100) starts at river source at higher ground (200), by constructing dams or weir (1) to raise water levels into the aqueduct, or by channeling water via diversion tunnels through mountains or hills (300) to divert lake or river water directly into the aqueducts. The dam (1), could be an existing dam, a diversion dam or weir, or a dry dam. Dry dam is constructed to only retain flood water in the event of storm or heavy rainfall. Weir also can be constructed to divert and raise water invert levels into aqueducts. The intake of water also starts at a water retention pond, lake or river (400). The aqueduct system (100) is elevated above ground or located on the ground and extends along the path of an existing river or channel (400) or any other suitable route during which the aqueduct (100) may branch away, until reaching the sea (500), where the water is discharged above high tide level (16). Where the sea is too far from inland, the aqueduct system directs the water into a lake, reservoir or retention pond (600), as shown in FIG. 1B.

Figure 2:
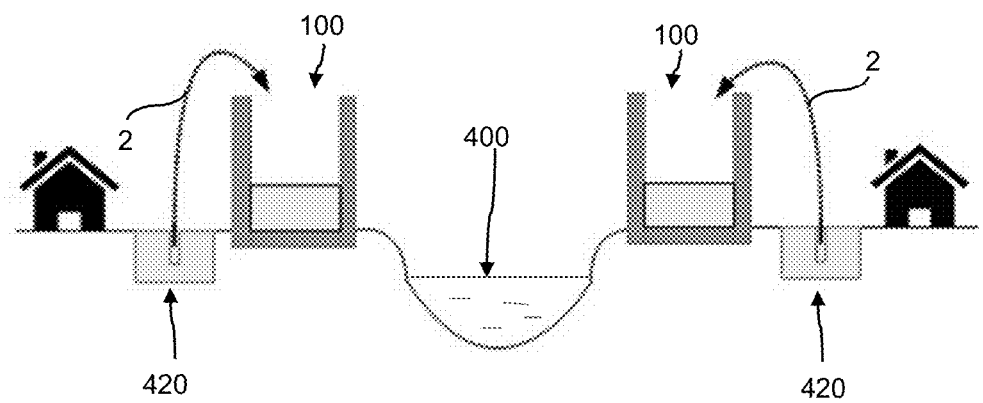
FIG. 2 illustrates the utilization of water pump to pump water from nearby development or pond into the aqueduct system.

To facilitate water intake, a plurality of pumps (2) is installed at certain areas to pump water from a retention pond, lake or river (420) into the aqueduct system (100), as shown in FIG. 2. The pumps (2) may be electrically, hydraulically or manually powered. The pumps (2) may be automatically activated when the water rises above a certain level.

Figure 3A:
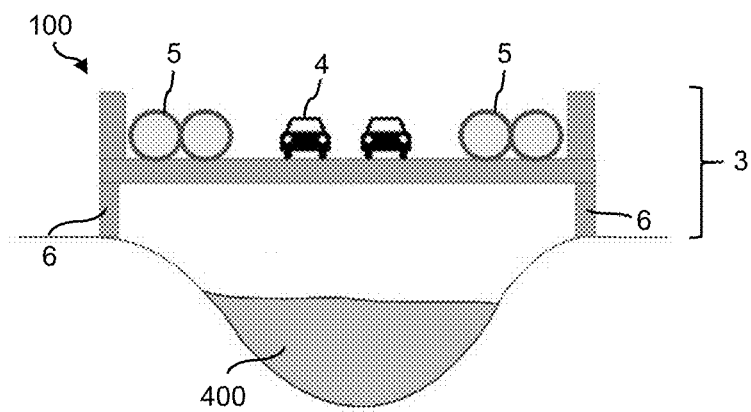
FIGS. 3A, 3B and 3C illustrate the aqueduct constructed as bridge-like structure over the river path. The aqueduct can be used as (FIGS. 3A, 3C) motorway alongside culverts that divert water, or (FIGS. 3B, 3C) water channel as a whole.
Figure 3B:
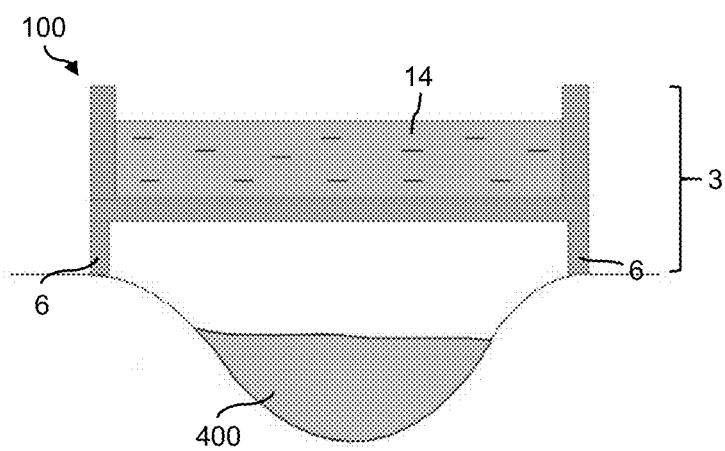
Figure 3C:
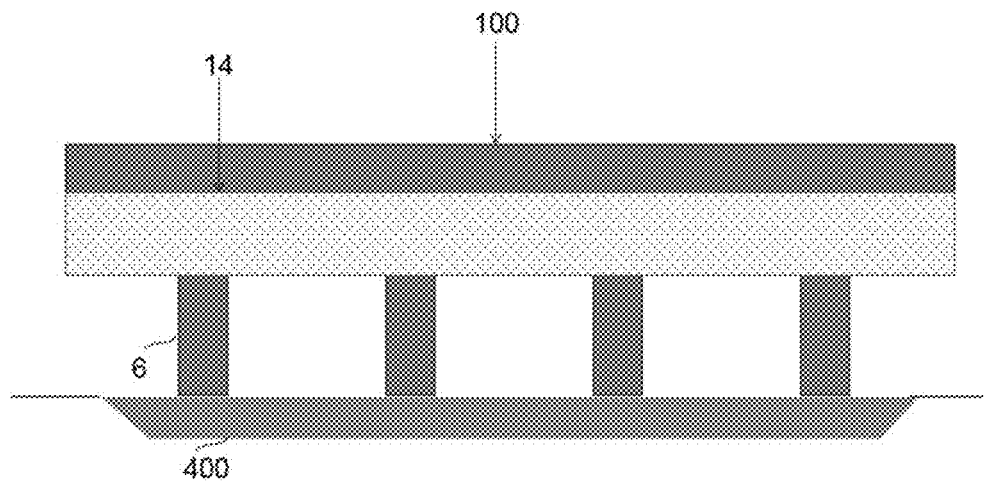
Figure 4:
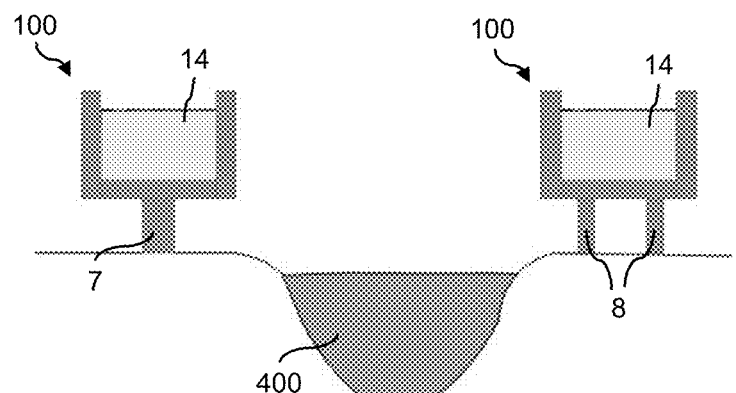
FIG. 4 illustrates the aqueduct constructed as bridge-like structure along the river sides. The aqueduct is supported by single piers or double piers along its body.

In one embodiment, the aqueduct system (100) is installed parallel and over the river path as elevated, large bridge-like structures (3). The bridge-like structures have open top. In such configuration, the aqueduct may serve as a motorway (4) alongside large culverts (5) that are used to divert large and moderate volumes of flowing water (14), as shown in FIG. 3A. Alternatively, the whole of the aqueduct is used to divert large volumes of water, as shown in FIGS. 3B & 3C. When installed over the course of the river, the bridge-like structures are supported by pillars (6) at both sides of the river. The bridge-like structures (3) of the aqueducts (100) are supported by single piers (7) or double piers (8), as shown in FIG. 4, beams and/or suspension cables.

Figure 5A:
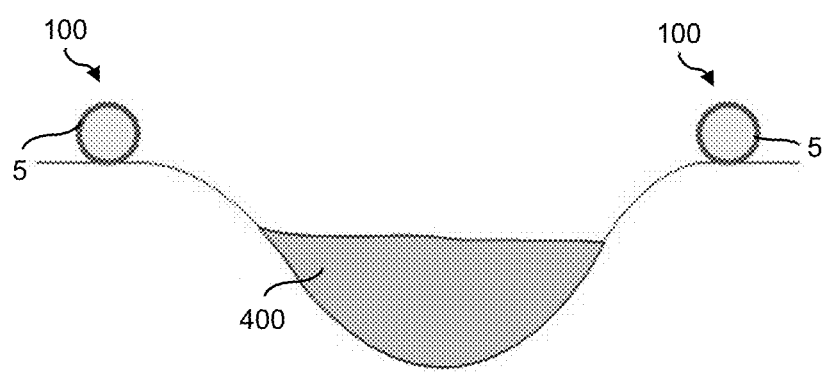
FIGS. 5A and 5B are illustrations of large culverts used as aqueducts along the river sides. The culverts are constructed on the ground (FIG. 5A) or elevated by bridge-like structures (FIG. 5B) that are supported by single or double piers.
Figure 5B:
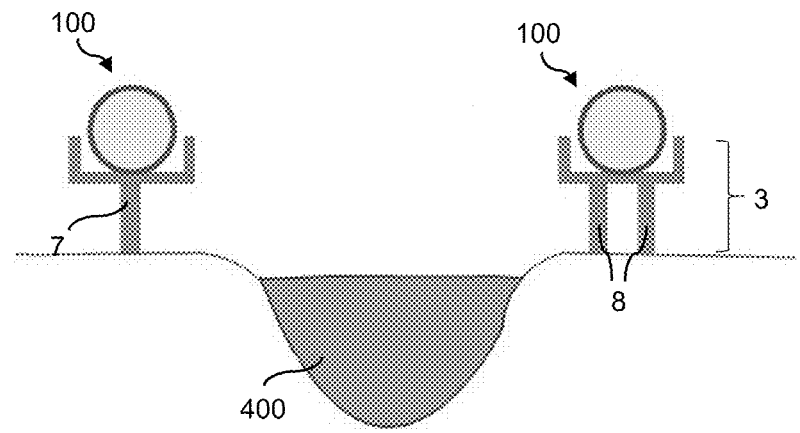

In another embodiment as shown in FIG. 5A, the aqueduct system (100) is configured as large culverts (5) that are constructed at both sides of the river (river banks) to allow intake of overflowing water from the river and create diversion of water via the aqueduct. Alternatively, the culverts (5) are held by bridge-like structures (3), as shown in FIG. 5B or suspension cables. The bridge-like structures (3) are elevated and supported by single piers (7) or double piers (8), beams and/or suspension cables. The aqueduct system (100) is elevated above ground or located on the ground and extends along the path of an existing river or channel (400).

Figure 6:
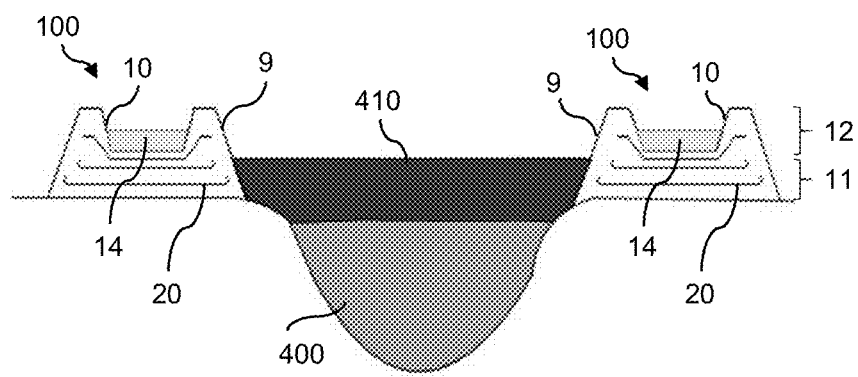
FIG. 6 illustrates the embankments or walls or dykes having constructed along both sides of the river to increase water holding capacity of the river while having aqueducts with concave or inverted trapezoid surface along the embankments to divert overflowing water.

In another embodiment as shown in FIG. 6, the aqueduct system (100) is constructed in the form of free standing walls or reinforced embankment or dyke (9). On one side of the wall facing the river, the standing wall extends from the river bank to increase the water holding capacity of the overflow river or storm water (410). On the other side of the wall facing away from the river, the wall is constructed in a concave or inverted trapezoid form (10) having open top along the river banks. Upon overflow of the maximum water level, the concave or inverted trapezoid structure (10) of the aqueduct serves as additional water channel to contain and divert the excess water. Where required, thicker wall (11) along the aqueduct system is constructed near the invert levels to support higher water pressures, while thinner wall (12) is constructed near the surface levels to support lower water pressures. Additional support structures (20) may be installed to reinforce the wall. The free standing walls or reinforced embankments or dyke (100) can be constructed using well-compacted earth or rockfill using geosynthetic reinforcements, such as geogrids, high strength reinforcement or steel tendons with or without anchor blocks. The aqueduct system (100) is elevated above ground or located on the ground and extends along the path of an existing river or channel (400).

Figure 7:
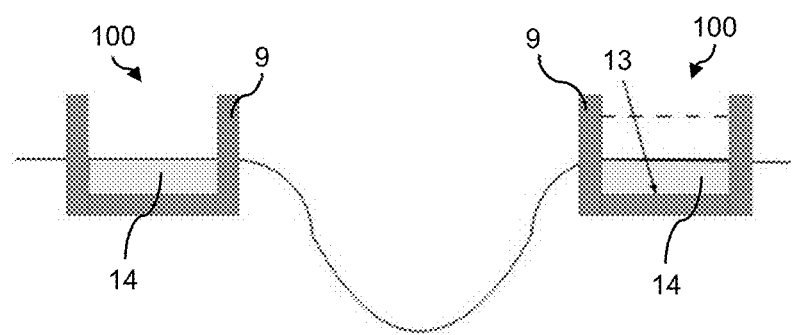
FIG. 7 illustrates the location of aqueducts on the ground beside the river as upward extensions drains above the ground level to increase the water holding capacity of the river combined with the drains.

In any configuration of the aqueduct system (100) installed along or branched from the river banks, the invert levels (13) of the aqueduct system (100) are higher than the high tide levels of the sea to ensure higher potential energy for the flow of water (14) from the aqueduct to the sea (500), as shown in FIG. 7. The aqueduct system (100) is built as upward extensions of river or monsoon drain above the ground level at both sides of the river or monsoon drain to increase the water holding capacity of the river combined with the drains. The extensions may be constructed as standing wall, embankment, dyke or bund (9). Apart from being diverted into sea (500), excess/flood water and water taken in from nearby development or retention ponds are diverted to a plurality of water holding systems comprising of lakes or larger retention ponds (600) for use as irrigation, household activities, drinking water source or groundwater recharging.

Figure 8:
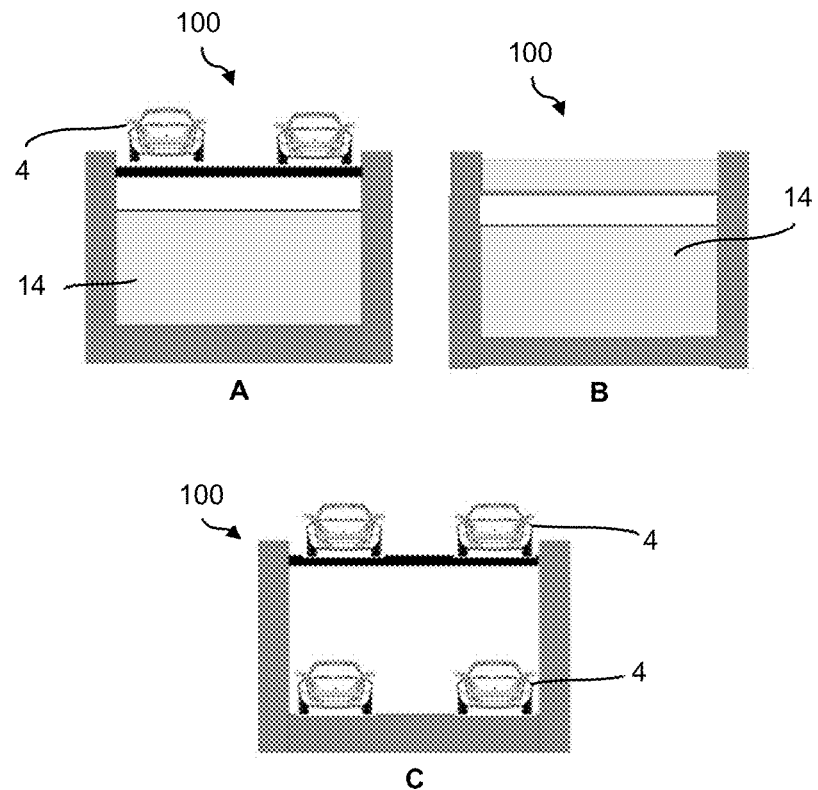
FIG. 8 illustrates the aqueduct system constructed with multiple decks to allow for concurrent traffic flow at the upper deck and water flow at the lower deck, allow water flow as a whole, or traffic flow at all decks.

Additionally, the aqueduct system (100) can be constructed in the multiple layers or decks to facilitate concurrent traffic flow and water flow, as shown in FIG. 8. The lower deck is used for water flow (14), while the upper deck is used as motorway (4), as shown in FIG. 8A. In the occurrence of very large amount of excess water, the upper deck can also be used for water flow (14), as shown in FIG. 8B. Alternatively, all decks can be used as motorway during normal days, as shown in FIG. 8C.

Figure 9:
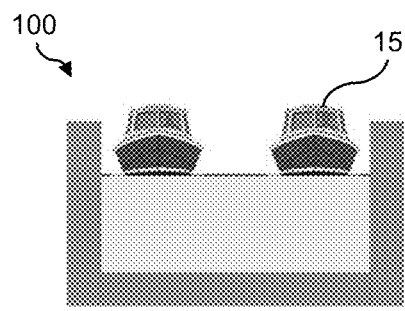

In addition to traffic and water diversion, aqueducts containing water deep enough for vessels or boats (15) to pass through are navigable and may be used for boating transport and recreational facilities on normal days, as shown in FIG. 9.

The installation of aqueducts (100) near rivers, water retention ponds, lakes and/or flood-prone areas (400) enables immediate diversion of water to prevent floods. Branches along the aqueduct system may be constructed to form bypass routes, where possible, to allow quick discharge (16) of water into the sea (500), and/or another lake, retention pond or storage tank (600).

Figure 10:
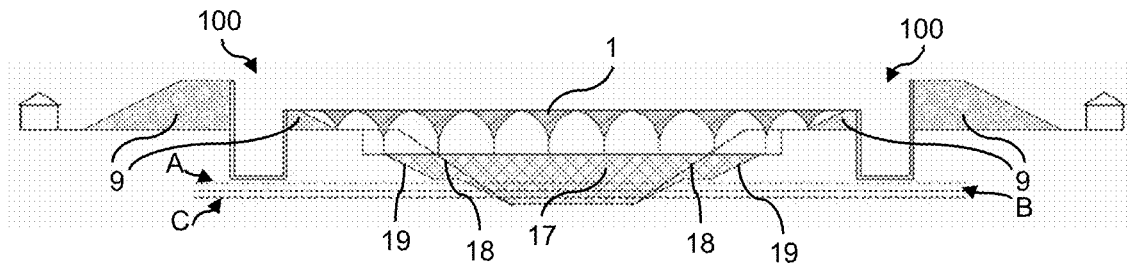
FIG. 10 illustrates an installation of dry dams or weir with flood gates across the sections of river or river mouth, and embankments or dykes along both sides of the river to with aqueducts on either sides or single side.

In one embodiment, as shown in FIG. 10, dry dams or weir (1) is installed with flood gates (17) at the river mouth or along the river to re-route the flood water to aqueducts (100) formed by the installation of additional embankments or dykes (9) if required in order to elevate the invert levels above high tide levels. Additionally, the existing river bank (18) is widened to a new width (19) to increase the water holding capacity of the river. The purpose of the flood gate installed at the river mouth is to prevent intrusion of sea water when the tide is high (A). Preferably, when the tide is normal (B) and low (C) the flood gates will be open, however when the tide is high (A), the flood gates will be closed or blocked and the structure will behave like a weir with aqueducts installed at both sides to capture the over flowing (100) water and discharge into the sea with invert level higher than high tide (A).

The FIG. 11, illustrates the existing river bank as shown in FIG. 10 having aqueducts (100) with the increase of the river level or when overflowing, when the flood gates is in closed condition.

In another embodiment, the FIG. 12 illustrates the aqueduct installation method at mid of road/or side of road/highway, in urban or rural side. When installed near the course of the road/or side of road/highway, the bridge-like structures are supported by pillars (6) at both sides of the river. The bridge-like structures (3) of the aqueducts (100) are supported by single piers (7) or double piers (8), as also shown in FIG. 4, beams and/or suspension cables.

In another embodiment, the FIG. 13 illustrates the aqueduct method of installation going across or along develop site such as residential or city. When installed near the course of the develop site such as residential or city, the bridge-like structures are supported by pillars (6) at both sides of the river. The bridge-like structures (3) of the aqueducts (100) are supported by single piers (7) or double piers (8), as also shown in FIG. 4, beams and/or suspension cables.

The present invention may be embodied in other specific forms without departing from its essential characteristics. The described embodiments are to be considered in all respects only as illustrative and not restrictive. The scope of the invention is, therefore indicated by the appended claims and the description given. All changes, which come within the meaning and range of equivalency of the claims, are to be embraced within their scope.

The invention claimed is:

1. A system for flood water or water flow mitigation, comprising:
   at least one aqueduct or drain supported by at least one of a pillar and pier,
   wherein the aqueduct or drain has a first section that is linked to a river, lake, reservoir, water retention pond or dam, and another section that is linked to a storage tank or sea, in which the at least one aqueduct or drain is elevated above ground level using bridging structures,
   wherein the first section is positioned at higher elevation than the other section, and the other section is elevated higher than sea levels during high tide or flooding, such that the aqueduct is extended along a path of an existing river or channel at an elevated level above-ground of the aqueduct discharges or holds the water to a certain flow and depth to allow navigation of at least one vessel or boat for use of water-based recreational activity, and transportation within the at least one aqueduct or drain, and water mitigation such that flood water is discharged into the sea or the storage tank above the sea level.

2. The system according to claim 1, wherein the at least one aqueduct or drain is constructed along or across a river, lake, reservoir, or water retention pond, or existing drain.

3. The system according to claim 1, further comprising additional aqueducts or drains extending from sides of the river, lake, reservoir, or water retention pond, or existing drain as a free-standing wall, dyke, or bund for increasing the water-holding capacity of the river, lake, reservoir, or water retention pond, or existing drain.

4. The system according to claim 3, wherein said at least one aqueduct or drain is linked to at least one upward extension having an additional channel to divert away overflowing water or storing the water, where the water is used for irrigation, ground-water recharging, or as water supply.

5. The system according to claim 1, wherein water is pumped from the river, lake, reservoir, or water retention pond, or existing drain via diversion culverts into the at least one aqueduct or drain using a plurality of pumps.

6. The system according to claim 1, wherein the at least one aqueduct or drain is made of multiple decks or platform to accommodate water flow, and as a motorway independently.

7. The system according to claim 1, further comprising a floodgate, dam or weir that is constructed at the mouth of the river to channel the water into the at least one aqueduct or drain, and discharge water flow directly into the sea or storage tank above the sea level.

8. The system according to claim 1, wherein the at least one aqueduct or drain is used as a route for water-based transportation and recreational activities.

9. A method for mitigating flood or water flow, comprising:

assembling at least one aqueduct or drain supported by at least one pillar and pier;

linking a first section of said at least one aqueduct or drain to a river, lake, reservoir, water retention pond or dam;

linking another section to a storage tank or sea;

elevating the at least one aqueduct or drain as a water-based transportation route; and forming multiple decks or platforms of the at least one aqueduct or drain, wherein, the positioning of the first section is higher than the other section, and placement of the at least one aqueduct or drain is to be above-ground level or extend upward from sides of the river or an existing drain, such that invert levels of the at least one aqueduct or drain are higher than sea levels during high tide-flooding or increased sea levels, wherein the positioning of the first section is at a higher elevation than the other section, wherein the other section is positioned at a higher elevation than sea levels during high tide or flooding, such that the water is discharged or held to a certain flow and depth using the at least one aqueduct or drain that is extended along a path of an existing river or channel at elevated level above-ground of the at least one aqueduct or drain, and allow navigation of at least one vessel or boat for use of water-based recreational activity and transportation within the at least one aqueduct or drain, and for water mitigation such that flood water is discharged into the sea or the storage tank above the sea level.

10. The method according to claim 9, further comprising elevating the at least one aqueduct or drain above ground level using bridging structures.

11. The method according to claim 9, further comprising assembling additional aqueducts or drains to extend sides of the river, lake, reservoir, or water retention pond, or existing drain as a free-standing wall, dyke, or bund for increasing the water-holding capacity of the river, lake, reservoir, or water retention pond, or existing drain.

* * * * *